United States Patent Office 3,483,233
Patented Dec. 9, 1969

3,483,233
3 - CYANOMETHYLENE-ANDROSTENES AND -OESTRENES AND PROCESS FOR THEIR PREPARATION
Ulrich Stache, Hofheim, Taunus, Werner Fritsch, Neuenhain, Taunus, Werner Haede, Hofheim, Taunus, Kurt Radscheit, Kelkheim, Taunus, and Gerhard Vogel, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Mar. 14, 1967, Ser. No. 622,926
Claims priority, application Germany, Mar. 19, 1966, F 48,706
Int. Cl. C07c 169/08, 167/00
U.S. Cl. 260—397.3
10 Claims

ABSTRACT OF THE DISCLOSURE

The manufacture of 3-cyanomethylene derivatives of the androstane and oestrane series by reacting 3-oxo-steroids with cyanomethyl-dialkyl phosphonates.

The present invention relates to 3-cyanomethylene-androstenes and -oestrenes as well as to the process for their preparation.

These new compounds of the general Formula I

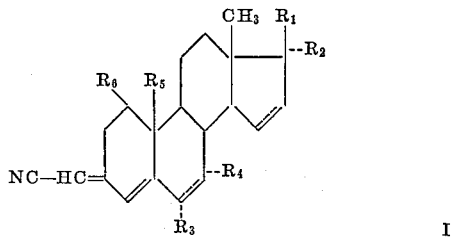

I wherein $R_1$ represents the hydroxy group, an aliphatic, aromatic, araliphatic or cycloaliphatic acyloxy group containing 1–12 C-atoms, an aliphatic or cycloaliphatic alkoxy radical, a phenoxy or aralkoxy radical or the groups

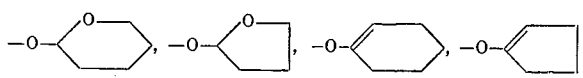

$R_2$ represents hydrogen, a saturated or unsaturated aliphatic hydrocarbon radical which contains at most 3 C-atoms and which may be substituted by fluorine or chlorine atoms, or $R_1$ and $R_2$ together represent a keto or ketal group, $R_3$ represents hydrogen, methyl, fluorine, chlorine, trifluoromethyl and $R_4$, $R_5$ and $R_6$ represent hydrogen, or methyl, the groups $R_3$ and $R_4$ together may also represent the 6,7-oxido group, and the compounds of Formula I may furthermore contain a 16-methylene group and/or a $\Delta^{6(7)}$ or a $\Delta^{15(16)}$-double bond, can be prepared by reacting mono- or poly-unsaturated 3-oxo-steroid derivatives of the general Formula II

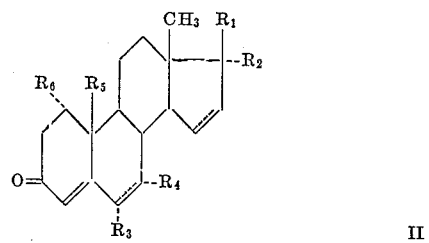

II wherein $R_1$ to $R_6$ have the above-mentioned meanings and a methylene group may be present in 16-position, with cyanomethyldialkyl phosphonates in the presence of anhydrous bases in inert organic solvents. If a 17-beta-acyloxy group is desired, a hydroxy group in the 17-beta-position can be esterified to the corresponding 17-beta-acyloxy group, or a ketal group in the 17-position can be hydrolyzed.

Since the reaction is started with unsaturated steroid derivatives, e.g. 3-oxo-$\Delta^4$- or 3-oxo-$\Delta^{4,6}$-steroids, the 3-cyanomethylene-steroid derivatives of the mono- or poly-unsaturated androstene or oestrene compounds are normally obtained, by the process of the present invention, in the form of cis/trans isomer mixtures as regards the arrangement of the cyano-group in the exocyclic 3-double bond.

The process of the invention for example takes place according to the following formula scheme when using a 3-oxo-$\Delta^4$-androstene derivative:

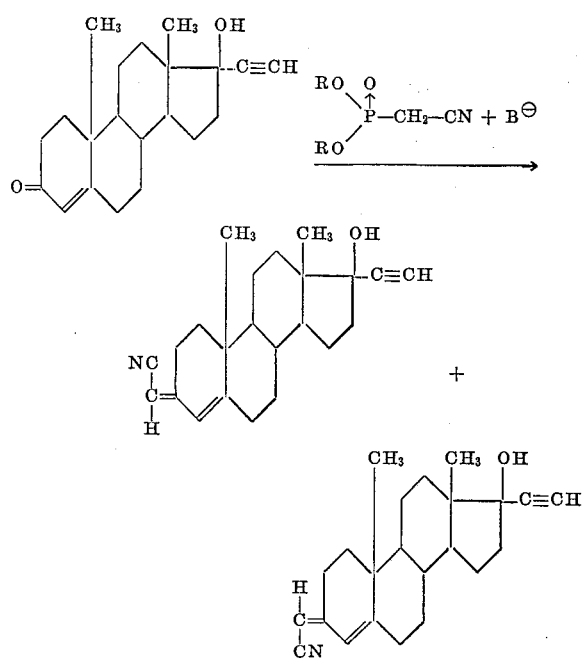

wherein R represents $CH_3$ or $C_2H_5$ and $B^\ominus$ represents a base.

The mono- or poly-unsaturated 3-oxo-compounds of the androstane or oestrane series, used as starting materials for the process of the present invention, are already known and prepared according to known processes.

It is surprising that an unprotected 17-keto-group of compounds of the androstane and oestrane series is not simultaneously converted to an olefinic bond, though in absence of 3-oxo-$\Delta^4$- groups a corresponding conversion of the 17-oxo-group to an olefinic bond with cyanomethyl-dialkyl phosphonates proceeds very smoothly.

The following are, for example, possible starting substances in accordance with the invention:

$\Delta^4$-androstene-3,17-dione
17-ethylenedioxy-$\Delta^4$-androstene-3-one
17$\beta$-hydroxy-$\Delta^4$-androstene-3-one
17$\beta$-hydroxy-17$\alpha$-methyl-$\Delta^4$-androstene-3-one
17$\beta$-hydroxy-17$\alpha$-ethyl-$\Delta^4$-androstene-3-one
17$\beta$-hydroxy-17$\alpha$-vinyl-$\Delta^4$-androstene-3-one
17$\beta$-hydroxy-17$\alpha$-ethinyl-$\Delta^4$-androstene-3-one as well as the 17 - acyloxy, 17 - alkoxy, 6$\alpha$-methyl, 7$\alpha$-methyl, 1-methyl, 16-methylene, $\Delta^{6(7)}$-dehydro, and 6$\alpha$-halogen derivatives thereof and the 17-acyloxy and 17-alkoxy derivatives of the 6$\alpha$-methyl, 7$\alpha$-methyl, 1-methyl, 16-methylene, $\Delta^{6(7)}$-dehydro, and 6$\alpha$-halogen derivatives.

Moreover, there may be used as starting materials from the oestrane series all 19-nor-derivatives (=$\Delta^4$-oestrenes series) of the aforementioned compounds of the androstane series as well as the 6,7-oxido derivatives of said compounds.

It is of advantage to use as phosphonates cyanomethyl-dimethyl phosphonate or cyanomethyldiethyl phosphonate.

As bases there may be used especially alkali metal and alkaline earth metal hydrides, as well as alkali metal and alkaline earth metal alcoholates and amides, preferably sodium or potassium hydride, -amide, -methylate, -ethylate or -tert.-butylate.

The 3-oxo-$\Delta^4$-derivatives are added as a solution or suspension in an inert organic solvent as solution or suspension to a solution or suspension of one of the bases and phosphonates mentioned. Such solvents are for example ether, preferably diethyl ether, tetrahydrofurane, dioxane, glycoldimethyl ether, diethyleneglycol dimethyl ether, dimethylsulfoxide, dimethylformamide, aromatic or aliphatic hydrocarbon substances such, for example as benzene, toluene, hexane or alcohols such as methanol, ethanol, tert.-butanol or mixtures of these solvents. It is advantageous to use the base as well as the phosphonate in excess such, for example, as 1 to 10 mole equivalents, preferably 1 to 5 mole equivalents. The reaction is carried out at temperatures between —70° and the boiling point of the solvents used, preferably between room temperature and the boiling temperature of the solvent. The reaction periods may vary from 1 minute to about 48 hours, in general, however, the reaction is terminated between 30 minutes and 2 hours.

It is also possible to proceed in the reverse manner, by first introducing the solution or suspension of the steroid component into that of the phosphonate and adding the solution of the base or by first combining the two other reaction components and then adding the phosphonate. If desired, the reaction mixture may be subjected to the above-mentioned reaction conditions for a longer period than required, without subsequent chemical modification of the products of the process.

The products of the process are isolated by generally known methods. After termination of the reaction the reaction mixture is poured into water and the crystalline or pseudo-crystalline precipitates are filtered off. Oily reaction products are extracted as usual with an appropriate organic solvent and, after washing with water and removing the solvents, they are isolated as oils, foams or, after crystallization from appropriate solvents, as crystalline compounds. The products of the present invention, normally obtained in the form of cis/trans isomeric mixtures, may be separated into their pure cis- or trans-isomers by fractional crystallization or by chromatographic separation. The yields obtained are between 80 and 100% of the theory.

It is known that synthetic derivatives of the androstane- and oestrane series have, in addition to a preferred hormonal effect, a spectrum of secondary activities whose presence or absence may be used in therapeutics. In the case of synthetic gestagens, the activities are, among others, of oestrogenic, androgenic or anabolic, gonadotropine-inhibiting, and corticoid-like nature, and an inhibiting activity on the function of the adrenal cortex can likewise be observed. In the case of the 3-cyanomethylene derivatives of the androstane- and oestrane series (=19-nor-androstane series) obtained according to the present invention, surprising dissociations of these activities, in comparison with those of known compounds such as the 3-keto compounds used as starting materials, can be observed, so that the 3-cyanomethylene derivatives they may be used as pregestagens. Thus the products of the present invention, especially the ostrene derivatives, may be used as contraceptive substances; moreover, they may be used as intermediary products for the preparation of further valuable steroid derivatives.

The products of the process, if desired or required in admixture with pharmaceutically usual carriers, may be orally or parenterally administered. When orally administered, the products are preferably used in form of tablets or dragées. For this purpose the products are worked up with the usual carriers such as lactose, starch, tragacanth and magnesium stearate.

In general, a single dose of about 0.5 to 5 mg. may be administered.

The following examples serve to illustrate the invention, but they are not intended to limit it thereto.

EXAMPLE 1

A solution of 400 mg. of sodium in 9 ccm. of absolute ethanol was added dropwise with stirring within 30 minutes at room temperature to a solution of 2.6 grams of $\Delta^4$-androstene-3-one-17$\beta$-ol and 3.05 grams of cyanomethyldiethyl phosphonate in 25 ccm. of ethanol. After stirring for 2½ hours at room temperature, the reaction mixture was poured into water and the oily crystalline product which precipitates after some time was filtered off and washed with water. After drying in vacuo over $P_2O_5$, 2.8 grams of 3-cyanomethylene-$\Delta^4$-androstene-17$\beta$-ol ($\lambda_{max}=272$ m$\mu$, $\epsilon=23,500$) were obtained and recrystallized several times from ether. A pure isomer of the reaction product was obtained, melting at 136–140° C. Characteristic IR bands: 3,500, 2,200, 1,600, 1,580 cm.$^{-1}$. $\lambda_{max}=272$ m$\mu$, $\epsilon=24,400$.

EXAMPLE 2

(a) To a suspension of 510 mg. of sodium hydride in 7 ccm. of absolute tetrahydrofurane, 4.3 grams of cyanomethyl-diethyl phosphonate (or cyanomethyl-dimethyl phosphonate) were added dropwise while stirring and cooling. When the development of $H_2$ ceased a solution of 3 g. of $\Delta^4$-oestrene-3-one-17$\beta$-ol in 20 ccm. of absolute tetrahydrofurane was added to the reaction solution and the reaction mixture was stirred for 2½ hours at bath temperature between 40 and 50° C. The mixture was then poured into water, the crystalline precipitate was filtered off, thoroughly washed with water and dried in vacuo. 3 grams of 3-cyanomethylene-$\Delta^4$-oestrene-17$\beta$-ol melting at 182–188° C. ($\lambda_{max}=272$ m$\mu$, $\epsilon=24,100$) were obtained and recrystallized from acetone/ether. Melting point: 188–190° C. $\lambda_{max}=272$ m$\mu$, $\epsilon=23,500$. Characteristic IR bands: 3,470, 2,200, 1,620, 1,580 cm.$^{-1}$.

(b) 2 grams of 3-cyanomethylene-$\Delta^4$-oestrene-17$\beta$-ol and 500 mg. of p-toluenesulfonic acid were suspended in 15 ccm. of absolute glacial acetic acid and 15 ccm. of absolute acetic acid anhydride and stirred for 90 minutes at room temperature. The reaction mixture was then poured into water, the crystalline precipitate filtered off, thoroughly washed with water and dried in high vacuum over potassium hydroxide. 2.3 grams of 3-cyanomethylene-$\Delta^4$-oestrene-17$\beta$-ol-acetate melting at 131–136° C. were obtained. $\lambda_{max}=272$ m$\mu$, $\epsilon=24,700$. Characteristic IR bands: 2,200, 1,740, 1,630, 1,580, 1,260 cm.$^{-1}$.

EXAMPLE 3

To a suspension of 510 mg. of sodium hydride in 9 ccm. of absolute tetrahydrofurane, 4.3 grams of cyanomethyl-diethyl phosphonate were added dropwise while stirring and cooling. When the development of hydrogen ceased, a solution of 3.1 g. of $\Delta^4$-oestrene-3-one-17$\beta$-ol-acetate in 16 ccm. of absolute tetrahydrofurane was added to the reaction mixture and stirred for 2½ hours at room temperature. The reaction mixture was then poured into water, the crystalline precipitate was filtered off, thoroughly washed with water and dried in vacuum. 3.0 grams of 3-cyano-methylene - $\Delta^4$ - oestrene-17$\beta$-ol-acetate melting at 131–136° C. were obtained. $\lambda_{max}=272$ m$\mu$, $\epsilon=24,700$. Characteristic IR bands: 2,200, 1,740, 1,630, 1,580, 1,260 cm.$^{-1}$.

EXAMPLE 4

A solution of 400 mg. of sodium in 9 ccm. of absolute ethanol was added dropwise with stirring to a solution of 2.6 grams of 17$\alpha$-methyl-$\Delta^4$-androstene-3-one-17$\beta$-ol and 3.1 grams of cyanomethyl-diethyl phosphonate in 5 ccm. of absolute tetrahydrofurane and 20 ccm. of absolute ethanol. After stirring for 3 hours at room temperature the reaction mixture was poured into water, the crystalline precipitate was filtered off, thoroughly washed with water and dried in vacuum. 2.6 grams of 3-cyanomethylene-17α-methyl-Δ$^4$-androstene-17β-ol melting at 135–145° C. were obtained and recrystallized from ether. $\lambda_{max}$=272 mµ, $\epsilon$=24,700. Characteristic IR bands: 3,500, 2,220, 1,630, 1,590 cm.$^{-1}$.

In order to esterify the 17-hydroxyl group, 5.3 grams of 3-cyano-methylene-17α-methyl - Δ$^4$ - androstene-17β-ol and 1.5 grams of p-toluenesulfonic acid were suspended in 50 ccm. of glacial acetic acid and 50 ccm. of acetic anhydride. After stirring for 90 minutes at 20° C., the reaction mixture was poured into water and the crystalline precipitate was filtered off. After washing with water and drying, 5 grams of 3-cyano-methylene-17α-methyl-Δ$^4$-androstene-17β-ol-acetate were obtained. $\lambda_{max}$=272 mµ, $\epsilon$=25,500. Characteristic IR bands: 2,200, 1,730, 1,620, 1,580, 1,260 cm.$^{-1}$.

EXAMPLE 5

To the sodium compound of the phosphonate prepared from 2.2 grams of sodium hydride and 18 grams of cyanomethyl-diethyl phosphonate in 30 ml. of absolute tetrahydrofurane (preparation as described in Example 2) was added a suspension of 12.5 grams of 17α-ethinyl-Δ$^4$-androstene-3-one-17β-ol in 90 ccm. of absolute tetrahydrofurane. The reaction mixture was then heated for 2½ hours up to 50–60° C., with the suspended constituents going into solution. The reaction mixture was then poured into water, the crystalline precipitate filtered off, washed with water and dried in vacuum. 13.6 grams of crystalline 3-cyanomethylene - 17α - ethinyl - Δ$^4$ - androstene-17β-ol melting at 209–212° C., $[\alpha]_D^{dioxane}$=+135°, were obtained. $\lambda_{max}$=272 mµ. $\epsilon$=24,100. Characteristic IR bands: 3,500, 3,300, 2,200, 1,630, 1,590 cm.$^{-1}$.

By fractional crystallization from methylene chloride/ether, the two cis/trans isomers were separated:

Isomer 1: melting point 212–213° C. $[\alpha]_D^{dioxane}$=+52°.
Isomer 2: melting point 155–158° C. $[\alpha]_D^{dioxane}$=+190°.

Both isomers show the same UV and IR spectrum values as the cis/trans isomer mixture.

3.5 grams each of the two pure cis/trans isomers were esterified respectively with 28 ccm. of glacial acetic acid, 28 ccm. of acetic anhydride and 860 mg. of p-toluenesulfonic acid, as described in Example 2(b). The two pure cis/trans isomers of the 3-cyanomethylene-17α-ethinyl-Δ$^4$-androstene-17β-ol-acetate (3.8 or 3.9 grams) were respectively obtained.

17-acetate of isomer 1: melting point 190–192° C. $[\alpha]_D^{dioxane}$=+43°.
17-acetate of isomer 2: melting point 138–141° C. $[\alpha]_D^{dioxane}$=+174°.

Both isomers showed the same characteristic UV and IR spectra: $\lambda_{max}$=272 mµ, $\epsilon$=24,000. Characteristic IR bands: 3,300, 2,200, 1,750, 1,620, 1,590, 1,250, 1,230 cm.$^{-1}$.

EXAMPLE 6

To a suspension of 395 mg. of sodium hydride in 6 ccm. of absolute tetrahydrofurane, 3.3 grams of cyanomethyl-diethyl phosphonate were added dropwise while stirring and cooling. When the development of H$_2$ ceased, a solution of 2.33 grams of 17α-methyl-Δ$^4$-oestrene-3-one-17β-ol in 15 ccm. of absolute tetrahydrofurane was added dropwise and the reaction mixture was stirred for 2½ hours at a temperature in the range of from 50 to 60° C., or for about 3 hours at room temperature.

The reaction mixture was then poured into water, the crystalline precipitate was filtered off, washed with water and dried. 2.3 grams of crude 3-cyanomethylene-17α-methyl-Δ$^4$-oestrene-17β-ol ($\lambda_{max}$=273 mµ, $\epsilon$=22,900) were obtained and recrystallized several times from methylene chloride ether. Melting point: 241–245° C. $\lambda_{max}$=273 mµ, $\epsilon$=23.700, Characteristic IR bands: 3,500, 2,200, 1,625, 1,590 cm.$^{-1}$.

In order to esterify the 17-hydroxyl group, 300 mg. of crude 3-cyano-methylene-17α-methyl-Δ$^4$-oestrene-17β-ol were esterified with 2.4 ml. of glacial acetic acid, 2.4 ml. of acetic anhydride and 75 mg. of p-toluenesulfonic acid (as described in Example 2b) and worked up as usual. After drying in vacuum over potassium hydroxide, 300 mg. of crude 3-cyanomethylene-17α-methyl-Δ$^4$-oestrene-17β-ol-acetate (melting range: 95–100° C.) were obtained in pure form by recrystallization from ether. $\lambda_{max}$=272 mµ, $\epsilon$= 23,800. Characteristic IR bands: 2,210, 1,740, 1,630, 1,590, 1,260 cm.$^{-1}$.

EXAMPLE 7

To a suspension of 292 mg. of sodium hydride in 5 ccm. of absolute tetrahydrofurane, 2.53 grams of cyanomethyl-diethyl phosphonate were added dropwise while stirring and cooling. When the development of H$_2$ terminated, a suspension of 1.7 grams of 17α-ethinyl-Δ$^4$-oestrene-3-one-17β-ol in 15 ccm. of absolute tetrahydrofurane was added to the reaction mixture and then stirred for 2 hours at 50–60° C. The reaction mixture was then poured into water, the crystalline precipitate was filtered off, washed with water and dried. 1.72 grams of 3-cyanomethylene - 17α - ethinyl - Δ$^4$ - oestrene - 17β - ol melting at 144–145° C. were obtained. $\lambda_{max}$=272 mµ, $\epsilon$=23,000. Characteristic IR bands: 3,500, 3,320, 2,200, 1,630, 1,590 cm.$^{-1}$.

EXAMPLE 8

(a) To a suspension of 150 mg. (or 64 mg. respectively) of sodium hydride in 4 ccm. of absolute tetrahydrofurane, 1.3 grams (or 500 mg. respectively) of cyanomethyl-diethyl phosphonate were added dropwise while stirring and cooling. When the development of H$_2$ ceased a suspension of 900 mg. of 17α-ethinyl-Δ$^4$-oestrene-3-one-17β-ol-acetate in 8 ccm. of absolute tetrahydrofurane was added to the clear reaction solution and stirred for 3 hours at room temperature. The reaction mixture was then poured into water, the crystalline precipitate was filtered off, washed with water and dried. 960 mg. of 3 - cyanomethylene - 17α - ethinyl - Δ$^4$ - oestrene - 17β-ol-acetate melting at 142–145° C. were obtained. $\lambda_{max}$=272 mµ, $\epsilon$=23,900. Characteristic IR bands: 3,320, 2,220, 1,750, 1,630, 1,590, 1,260, 1,230 cm.$^{-1}$. By recrystallizing several times from ether, a pure isomer melting at 160–162° C. was obtained.

(b) 1.4 grams of 3-cyanomethylene-17α-ethinyl-Δ$^4$-oestrene-17β-ol were esterified with 12 ccm. of glacial acid, 12 ccm. of acetic anhydride and 375 mg. of p-toluenesulfonic acid as described in Example 2(b) and worked up as usual. 1.5 grams of 3-cyanomethylene-17α-ethinyl-Δ$^4$-oestrene-17β-ol-acetate were obtained, having the same data as stated under (a).

EXAMPLE 9

To a solution of 5 grams of 7α,17α-dimethyl-Δ$^4$-androstene-3-one-17β-ol and 6.4 grams (or 3 grams respectively) of cyanomethyl-diethyl phosphonate in 25 ccm. of absolute tetrahydrofurane or dioxane, a solution of 800 mg. (or 370 mg., respectively) of sodium in 20 ccm. of absolute ethanol was added dropwise while stirring. After stirring for 4 hours at room temperature, the reaction mixture was poured into water. The crystalline product which precipitated after some time was filtered off, washed with water and dried. 5.4 grams of 3-cyanomethyl-7α,17α-dimethyl-Δ$^4$-androstene-17β-ol were obtained, partially as a still oily crystalline product, and recrystallized from a small quantity of ether: 4.5 grams of colorless crystals melting at 140–160° C. ($\lambda_{max}$=272 mµ, $\epsilon$=23,800). By repeatedly recrystallizing from acetone/ether, a pure isomer melting at 196–198° C. was obtained. $\lambda_{max}$=272 mμ, ε=23,500. Characteristic IR bands: 3,480, 2,200, 1,610, 1,570 cm.⁻¹.

In order to esterify the 17-hydroxyl group 4 grams of 3 - cyanomethylene - 7α,17α - dimethyl - Δ⁴ - androstene-17β-ol and 1 gram of p-toluenesulfonic acid were suspended in 30 ccm. of glacial acetic acid and 30 ccm. of acetic anhydride. After stirring for 90 minutes at 20° C., the reaction mixture was poured into water and the crystalline product which precipitated after some time was filtered off, washed and dried in vacuum over potassium hydroxide. 4.2 grams of 3-cyano-methylene-7α,17α-dimethyl-Δ⁴-androstene-17β-ol-acetate melting at 70–75° C. were obtained. λ$_{max}$=272 mμ, ε=25,200. Characteristic IR bands: 2,200, 1,730, 1,620, 1,580, 1,260 cm.⁻¹.

EXAMPLE 10

To a solution of 1.2 grams of Δ⁴-androstene-3,17-dione and 1 gram of cyanomethyl-diethyl phosphonate in 20 ccm. of absolute tetrahydrofurane, a solution of 95 mg. of sodium in 3 ccm. of absolute ethanol was added dropwise within 30 minutes while stirring. After stirring for 6 hours at room temperature, the reaction mixture was poured into water and extracted with ether, the ether extracts were washed with water and the solvent was distilled off. 1.3 grams of 3-cyanomethylene-Δ⁴-androstene-17-one were obtained as a clear oil which slowly crystallized on standing. The crystalline precipitate was taken up in cold ether/n-hexane which was then filtered to obtain the crystalline reaction product melting at 100–115° C. After recrystallization from ether the melting point was 127–130° C. λ$_{max}$=272 mμ, ε=27,000. Characteristic IR bands: 2,200, 1,740, 1,620, 1,580 cm.⁻¹.

EXAMPLE 11

To a suspension of 360 mg. of sodium hydride in 5 ccm. of absolute tetrahydrofurane, 3 grams of cyano-methyl-diethyl phosphonate were added dropwise while stirring and cooling. When the development of H₂ terminated, a suspension of 2 grams of 17α-ethinyl-Δ⁴,⁶-androstadiene-3-one-17β-ol in 10 ccm. of absolute tetrahydrofurane was added to the reaction mixture and the reaction solution was then stirred at a temperature within the range of from 40 to 60° C. The solution was then poured into water, the crystalline precipitate was filtered off, washed with water and dried. 2.1 grams of 3-cyano-methylene-17α-ethinyl-Δ⁴,⁶-androstadiene-17β-ol less melting at 185–195° C. were obtained. λ$_{max}$=312 mμ, ε=33,400. Characteristic IR bands: 3,420, 3,260, 2,200, 1,660, 1,590 cm.⁻¹.

In order to esterify the 17 hydroxyl group, 2 grams of 3 - cyanomethylene - 17α - ethinyl - Δ⁴,⁶ - androstadiene-17β-ol and 500 mg. of p-toluenesulfonic acid were suspended in 15 ccm. of glacial acetic acid and 15 ccm. of acetic anhydride. After stirring for 90 minutes at 20° C., the reaction mixture was poured into water, the crystalline precipitate was filtered off, washed and dried in vacuo over potassium hydroxide. 2.1 grams of 3-cyanomethylene-17α-ethinyl-Δ⁴,⁶-androstadiene-17β-ol-acetate melting at 95–100° C. were obtained. After recrystallization from ether the melting point was: 183–185° C. λ$_{max}$=312 mμ, ε=33,900. Characteristic IR bands: 3,280, 2,200, 1,745, 1,660, 1,590, 1,250 cm.⁻¹.

What we claim is:

1. A compound selected from the group consisting of (A) compounds of the formula

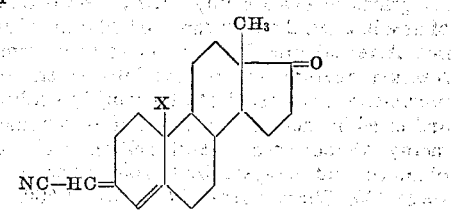

where X is methyl or hydrogen,
(B) compounds of the same formula additionally having a Δ⁶⁽⁷⁾-double bond, compounds of the same formula having a Δ¹⁵⁽¹⁶⁾-double bond, and the 16-methylene derivatives of the aforesaid compounds.

2. A compound as in claim 1 wherein X is methyl.
3. A compound as in claim 1 wherein X is hydrogen.
4. In a process for the preparation of 3-cyanomethylene derivatives of steroids of the androstane and oestrane series, which process comprises reacting a cyanomethyl dialkyl phosphonate with a steroid selected from the group consisting of (A) compounds having the formula

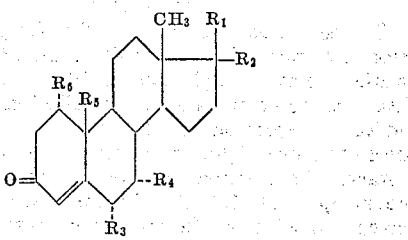

wherein R₁ taken alone represents hydroxy or acetoxy, R₂ taken alone represents hydrogen or saturated or unsaturated aliphatic hydrocarbon having at most 3 carbon atoms, R₁ and R₂ taken together represent oxo or ketal, R₃ represents hydrogen, methyl, fluorine, or chlorine, and R₄, R₅, and R₆ represent hydrogen or methyl, (B) compounds of the same formula additionally having a Δ⁶⁽⁷⁾-double bond, and (C) the 16-methylene derivatives of the aforesaid compounds, in an inert solvent in the presence of a base, whereby the corresponding 3-cyanomethylene compound is formed, the improvement wherein said base is sodium hydride.

5. A process as in claimed 4 wherein R₁ is 17-beta-hydroxy, and the 3-cyanomethylene-17-beta-hydroxy compound formed is subsequently acetylated to form the corresponding 3-cyanomethylene-17-beta-acetoxy compound.

6. A process as in claim 4 wherein R₁ and R₂ taken together are ketal, and the 17-ketal group of the 3-cyanomethylene compound formed is subsequently hydrolyzed.

7. 3 - cyanomethylene - 17-alpha-methyl-Δ⁴-oestrene-17-beta-ol.

8. 3 - cyanomethylene-17-alpha-methyl-Δ⁴-oestrene-17-beta-ol-acetate.

9. 3-cyano-methylene-17α-ethinyl-Δ⁴-oestrene-17β-ol.

10. 3 - cyano-methylene-17α-ethinyl-Δ⁴-oestrene-17β-ol-acetate.

References Cited

UNITED STATES PATENTS 3,337,590  8/1967  Bose et al. _____ 260—397

ELBERT L. ROBERTS, Primary Examiner

U.S. Cl. X.R.

260—397.5